(12) United States Patent
Wilcox et al.

(10) Patent No.: US 10,234,121 B2
(45) Date of Patent: Mar. 19, 2019

(54) FLAT TRIM RING LENS FOR OCCUPANCY SENSORS

(71) Applicant: Cree, Inc., Durham, NC (US)

(72) Inventors: Kurt S. Wilcox, Libertyville, IL (US); Jin Hong Lim, Cary, NC (US); Andrew Bendtsen, Racine, WI (US); Mike Walters, Apex, NC (US)

(73) Assignee: Cree, Inc., Durham, NC (US)

( * ) Notice: Subject to any disclaimer, the term of this patent is extended or adjusted under 35 U.S.C. 154(b) by 252 days.

(21) Appl. No.: 14/589,319

(22) Filed: Jan. 5, 2015

(65) Prior Publication Data

US 2016/0195252 A1    Jul. 7, 2016

(51) Int. Cl.
*F21V 23/04*   (2006.01)
*G01J 1/02*    (2006.01)
*G01J 1/04*    (2006.01)
*G01J 1/42*    (2006.01)
*F21S 8/02*    (2006.01)

(52) U.S. Cl.
CPC .......... *F21V 23/0471* (2013.01); *F21S 8/026* (2013.01); *F21V 23/0464* (2013.01); *G01J 1/0266* (2013.01); *G01J 1/0271* (2013.01); *G01J 1/0411* (2013.01); *G01J 1/4204* (2013.01); *G01J 1/4228* (2013.01); *G01J 1/0407* (2013.01)

(58) Field of Classification Search
CPC ................ G01J 1/0266; F21V 23/0471; F21V 23/0464; F21V 23/0478; F21V 23/0442; F21S 8/026
See application file for complete search history.

(56) References Cited

U.S. PATENT DOCUMENTS

| 4,321,594 | A   | 3/1982 | Galvin et al. |
| 4,787,722 | A   | 11/1988 | Claytor |
| 6,531,817 | B1  | 3/2003 | Holtslag et al. |
| 6,948,831 | B1* | 9/2005 | Naqvi ...................... F21S 8/02 |
| | | | 362/148 |

(Continued)

OTHER PUBLICATIONS

Cunningham, P.D. et al., "Broadband terahertz characterization of the refractive index and absorption of some important polymeric and organic electro-optic materials," Journal of Applied Physics, vol. 109, Issue 4, Feb. 15, 2011, American Institute of Physics, pp. 043505-1-043505-5.

Horwitz, J.W., "Infrared refractive index of polyethylene and a polyethylene-based material," Optical Engineering, vol. 50, No. 9, Sep. 2011, SPIE, pp. 093603-1-093603-3.

(Continued)

*Primary Examiner* — Alexander Garlen
*Assistant Examiner* — Christopher E Dunay
(74) *Attorney, Agent, or Firm* — Withrow & Terranova, P.L.L.C.

(57) ABSTRACT

A sensor module for a lighting fixture includes a light sensor and a sensor cover over the light sensor. The sensor cover includes a front surface and a light focusing surface opposite the front surface. The front surface is configured to face an area of interest that is generally illuminated by the lighting fixture. The light focusing surface is opposite the front surface and includes a number of lens sections, each of which is configured to focus light from a different portion of the area of interest toward the light sensor. By including a number of lens sections each focusing light from a different portion of the area of interest, a relatively large area of interest can be observed while maintaining desirable aesthetics of the sensor module.

26 Claims, 14 Drawing Sheets

(56) References Cited

U.S. PATENT DOCUMENTS

| | | | |
|---|---|---|---|
| 9,029,781 B2* | 5/2015 | Huang | G01J 1/42 |
| | | | 250/342 |
| 2007/0177384 A1 | 8/2007 | Sibalich et al. | |
| 2008/0150757 A1 | 6/2008 | Hutchison | |
| 2008/0198583 A1* | 8/2008 | McMillen | F21S 8/026 |
| | | | 362/147 |
| 2011/0253516 A1 | 10/2011 | Figueroa et al. | |
| 2013/0120963 A1* | 5/2013 | Holland | F21V 7/0066 |
| | | | 362/84 |
| 2013/0126739 A1* | 5/2013 | Oi | G01J 1/0266 |
| | | | 250/353 |
| 2015/0382432 A1* | 12/2015 | Eskonen | H05B 37/0227 |
| | | | 315/153 |
| 2016/0123816 A1 | 5/2016 | Pei et al. | |
| 2016/0377275 A1* | 12/2016 | Lim | F21V 23/0464 |
| | | | 362/362 |

OTHER PUBLICATIONS

O'Shea, D., "Elements of Modern Optical Design," New York: John Wiley & Sons, Inc., Aug. 14, 1985, 6 pages.

Non-Final Office Action for U.S. Appl. No. 14/732,167, dated Feb. 23, 2017, 15 pages.

Advisory Action for U.S. Appl. No. 14/732,167, dated Sep. 28, 2017, 3 pages.

Final Office Action for U.S. Appl. No. 14/732,167, dated Jun. 20, 2017, 17 pages.

Non-Final Office Action for U.S. Appl. No. 14/732,167, dated Jan. 22, 2018, 13 pages.

Non-Final Office Action for U.S. Appl. No. 14/732,167, dated Jul. 13, 2018, 13 pages.

Final Office Action for U.S. Appl. No. 14/732,167, dated Jan. 2, 2019, 13 pages.

* cited by examiner

FLAT TRIM RING LENS FOR OCCUPANCY SENSORS

FIELD OF THE DISCLOSURE

The present disclosure relates to sensor modules for lighting fixtures.

BACKGROUND

Modern lighting fixtures continue to evolve, incorporating features such as controllers, sensors, remote modules, and the like. These controllers, sensors, and remote modules may allow a lighting fixture to implement lighting programs, respond to the surrounding environment, and be controlled, for example, over a local area network and/or the internet. A number of different sensors may be incorporated into a lighting fixture in order to provide information about the surrounding environment. For example, a lighting fixture may include an ambient light sensor to gather information about the ambient light level in the area around the lighting fixture. Additionally, a lighting fixture may include an occupancy sensor to detect when an individual is located near the lighting fixture. While incorporating these sensors into a lighting fixture often provides valuable information that can be used to implement additional functionality, many sensors such as those mentioned above that measure light of one kind or another must have a line-of-sight to the surrounding environment. Further, it is often desirable to give these light sensors access to the largest possible area surrounding a lighting fixture in order to provide the maximum amount of information about the surrounding area. In other cases, it is desirable to provide a precise detection area for a light sensor. Generally, the particular goal of the light sensor will dictate the extent of the desirable coverage area.

When incorporating a sensor into a sensor module, the sensor generally must be covered by a sensor cover of some kind. Due to the requirements of many light-based sensors discussed above (i.e., line-of-sight to surrounding environment and access to a large surrounding area), sensor modules incorporating light sensors often include bulky and aesthetically unappealing sensor covers. For example, many conventional sensor modules include dome shaped sensor covers, and therefore substantially extrude from a lighting fixture, detracting from the aesthetic appeal thereof. Due to the size of these sensor module covers, many are located remotely from the lighting fixtures that they service, requiring separate installation and providing only limited information about the area directly surrounding the lighting fixture itself.

Accordingly, there is a need for a sensor module for a lighting fixture including a compact sensor cover suitable for mounting on the lighting fixture itself that blends with the aesthetics of the lighting fixture in order to provide a desirable appearance.

SUMMARY

The present disclosure relates to sensor modules for lighting fixtures. In one embodiment, a sensor module for a lighting fixture includes a light sensor and a sensor cover over the light sensor. The sensor cover includes a front surface and a light focusing surface opposite the front surface. The front surface is configured to face an area of interest that is generally illuminated by the lighting fixture. The light focusing surface is opposite the front surface and includes a number of lens sections, each of which is configured to focus light from a different portion of the area of interest toward the light sensor. By including a number of lens sections each focusing light from a different portion of the area of interest, a relatively large area of interest can be observed while maintaining desirable aesthetics of the sensor module.

In one embodiment, the light sensor is an infrared occupancy sensor. In an additional embodiment, the light sensor is an ambient light sensor.

In one embodiment, the front surface of the sensor cover is configured to lay flush with an exposed surface of the lighting fixture such that the sensor cover substantially blends in with the lighting fixture.

In one embodiment, each one of the lens sections is a Fresnel lens.

In one embodiment, the lens sections collectively have a field of view corresponding to a circular area of about 284 ft$^2$ for a working distance of about 12.5 ft.

In one embodiment, a lighting fixture includes a light source, a housing coupled to the light source, a light sensor, and a sensor cover. The sensor cover is coupled to the housing and over the light sensor. Further, the sensor cover includes a front surface and a light focusing surface opposite the front surface. The front surface is configured to face an area of interest that is generally illuminated by the lighting fixture. The light focusing surface is opposite the front surface and includes a number of lens sections, each of which is configured to focus light from a different portion of the area of interest to the light sensor. By including a number of lens sections each focusing light from a different portion of the area of interest, a relatively large area of interest can be observed while maintaining desirable aesthetics of the lighting fixture.

In one embodiment, the light sensor is an infrared occupancy sensor. In an additional embodiment, the light sensor is an ambient light sensor.

In one embodiment, the front surface of the sensor cover is configured to lay flush with an exposed surface of the lighting fixture such that the sensor cover substantially blends in with the lighting fixture.

In one embodiment, each one of the lens sections is a Fresnel lens.

In one embodiment, the lens sections collectively have a field of view corresponding to a circular area of about 284 ft$^2$ for a working distance of about 12.5 ft.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
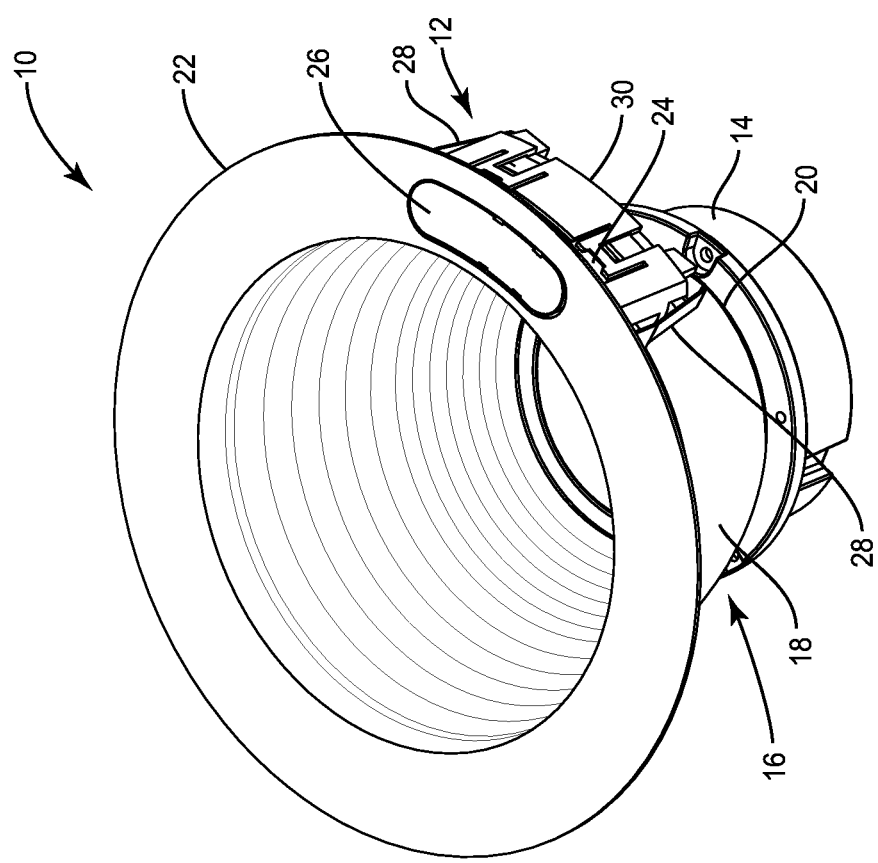
FIG. 1 shows an isometric view of a lighting fixture including a sensor module according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows an isometric view of a lighting fixture 10 including a sensor module 12 according to one embodiment of the present disclosure. The lighting fixture 10 is a recessed "can" lighting fixture including a control module 14 and a housing 16. A light source (not shown) is mounted inside the housing 16 and oriented such that light is emitted from the housing 16 and onto a desired area. The electronics (not shown) that are required to power and drive the light source are provided, at least in part, by the control module 14. While the lighting fixture 10 is envisioned to be used predominantly in 4, 5, and 6 inch recessed lighting applications for industrial, commercial, and residential applications, the concepts disclosed herein are applicable to virtually any size lighting fixture suitable for any application.

The housing 16 is cup-shaped and includes a sidewall 18 that extends between a bottom panel 20 at the rear of the housing 16, and a rim, which may be provided by an annular flange 22 at the front of the housing 16. The sensor module 12 is coupled to the sidewall 18 of the housing 16. The sensor module 12 includes one or more sensors (not shown), a module housing 24, and a sensor cover 26. The module housing 24 includes a mounting apparatus for coupling the sensor module 12 to the housing 16 of the lighting fixture 10. In one embodiment, the mounting apparatus may include one or more clips 28, which are inserted into a corresponding tab on the housing 16 to secure the sensor module 12 in place. Notably, the module housing 24 is mounted to the housing 16 of the lighting fixture 10 such that the sensor cover 26 is exposed at the front of the housing 16. The sensor cover 26 covers one or more sensors (not shown) within the sensor module and provides the sensors access to light within a desired area. In the embodiment shown in FIG. 1, the sensor cover 26 is flush-mounted within the annular flange 22. Specifically, the sensor cover 26 fits within a cutout in the annular flange 22 of the lighting fixture 10 such that the sensor cover 26 is integrated into the periphery of the lighting fixture 10.

Notably, the exposed front surface of the sensor cover 26 exposed through the annular flange 22 is substantially flat, such that the sensor cover 26 visually blends with the annular flange 22 and thus increases the aesthetic appeal of the lighting fixture 10. As discussed, above, conventional sensor covers are often bulky and aesthetically unappealing, often relying on shapes such as domes to provide the sensors within access to a desired amount of surrounding light. The sensor cover 26 shown in FIG. 1 provides the sensor with a desired amount of surrounding light, while simultaneously remaining compact and aesthetically appealing. A rear surface (also referred to as a light focusing surface) of the sensor cover 26 includes one or more lens segments in order to focus light from different areas surrounding the sensor cover 26 to the sensors within the sensor module 12, as discussed in detail below.

While the sensor cover 26 is shown as a kidney shape such that the sensor cover 26 is contoured to the annular flange 22 of the housing 16, the sensor cover 26 may be any shape. For example, the sensor cover 26 may be a square, a rectangle, a circle, or any other irregular shape without departing from the principles disclosed herein. Further, while the exposed surface of the sensor cover 26 is substantially flat, there may be one or more peripheral ridges in the sensor cover, for example, to properly secure the sensor cover 26 into the opening in the annular flange 22. Finally, while the sensor cover 26 is shown mounted in the annular flange 22 of the housing 16, the sensor cover 26 (and the sensor module 12 in general) may be mounted to any portion of the lighting fixture 10 without departing from the principles disclosed herein.

Once the lighting fixture 10 is in place, the face of the annular flange 22 may form part of a decorative trim ring assembly that rests flush against a surface, such as a drywall ceiling, into which the lighting fixture 10 is recessed. The exposed portion of the inside surface of the sidewall 18 may also form part of the decorative trim ring assembly that extends into the ceiling. As such, when the lighting fixture 10 is mounted in a ceiling, the primary portions of the lighting fixture that are typically visible are the face of the annular flange 22, the exposed inner portions of the sidewall 18, and the light source (not shown), which may be covered by a lens (not shown).

The control module 14 and the housing 16 may be integrated and provided by a single structure. Alternatively, the control module 14 and the housing 16 may be modular, wherein different sizes, shapes, and types of control modules 14 may be attached or otherwise connected to the housing 16 and used to drive the light source provided therein. In some embodiments, the control module 14 may be coupled to a heat sink (not shown) in order to divert heat away from the electronics therein.

While the concepts disclosed herein are primarily discussed with relation to a recessed lighting fixture as shown in FIG. 1, the concepts may be readily applied to any type of lighting fixture including but not limited to troffer-type fixtures, luminaires, pendants, or the like. The shape and size of the sensor module 12 and the sensor cover 26 may vary when used with different types of lighting fixtures in order to best integrate with the lighting fixture.

Figure 2:
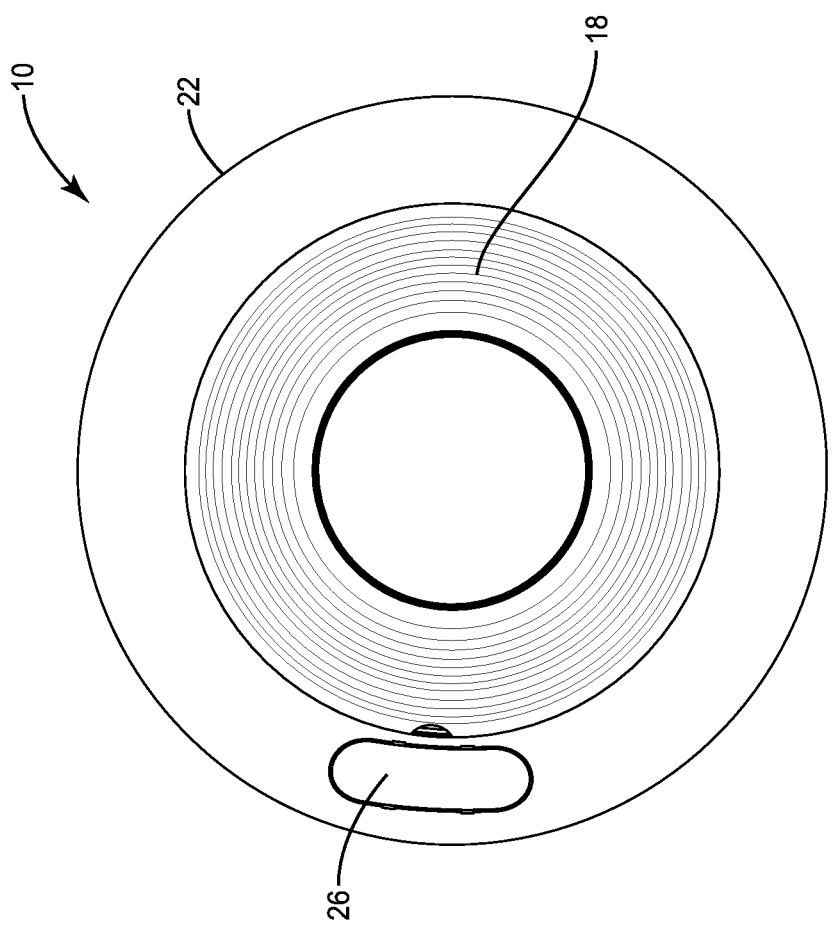
FIG. 2 shows a front view of the lighting fixture shown in FIG. 1 according to one embodiment of the present disclosure.

FIG. 2 shows a front view of the lighting fixture 10 according to one embodiment of the present disclosure. As shown in FIG. 2, the front of the annular flange 22 surrounds the inner portion of the housing 16, and includes the sensor cover 26 mounted in a cut-out therein. The sensor cover 26 may be flush-mounted with the annular flange 22 such that the sensor cover 26 visually blends with the annular flange 22 and provides a desirable aesthetic appearance of the lighting fixture 10.

Figure 3:
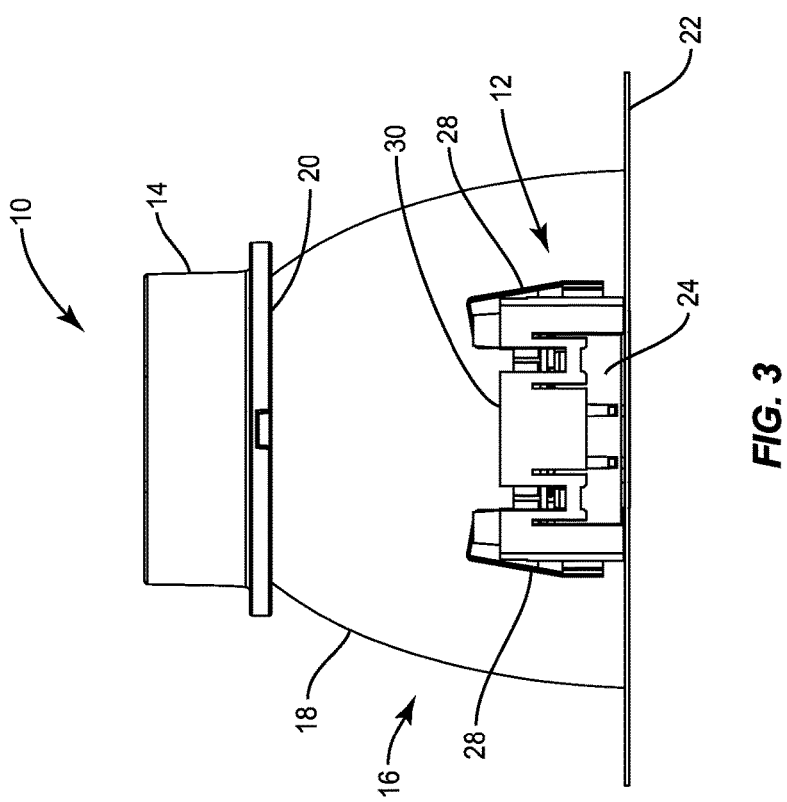
FIG. 3 shows a side view of the lighting fixture shown in FIG. 1 according to one embodiment of the present disclosure.

FIG. 3 shows a side view of the lighting fixture 10 including the sensor module 12 mounted to the housing 16 according to one embodiment of the present disclosure. In one embodiment a sensor module mount 30 may be coupled to the housing 16 and configured to receive and secure the sensor module 12 to the housing 16. The clips 28 described above may couple to the sensor module mount 30 thereby securing the sensor module 12 in place. While a specific sensor module 12 and sensor module mount 30 are shown, any suitable mounting structure may be used to secure the sensor module 12 without departing from the principles described herein.

Figure 4:
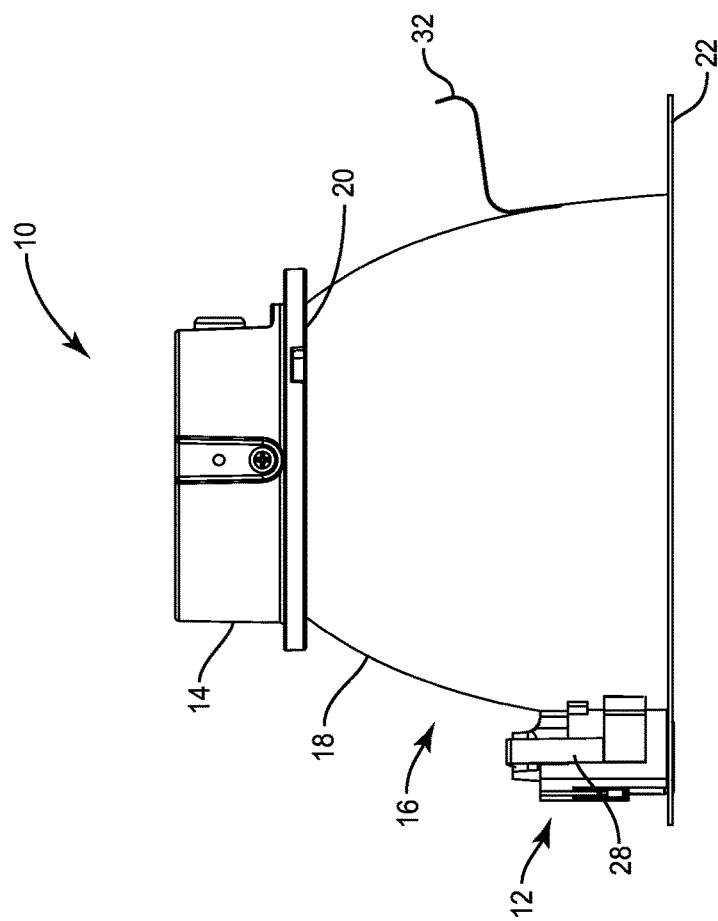
FIG. 4 shows an additional side view of the lighting fixture shown in FIG. 1 according to one embodiment of the present disclosure.

FIG. 4 is an additional side view of the lighting fixture including the sensor module 12 mounted to the housing 16 according to one embodiment of the present disclosure. FIG. 4 also shows a mounting clip 32 secured to the housing 16 and radially extending therefrom. Additional mounting clips 28 are generally provided but not shown. The mounting clips 28 are designed to affix the lighting fixture inside a cylindrical recessed lighting housing (not shown) for new or remodel construction. The mounting clips 28 effectively press against the inside surface of the recessed lighting housing, and, via a friction fit, hold the lighting fixture 10 inside of the recessed lighting housing.

FIGS. 5 through 8 show details of the sensor cover 26 according to one embodiment of the present disclosure. The sensor cover 26 includes a front surface 34, a rear surface 36 (also referred to herein as a light-focusing surface), and an outer periphery 38. While the outer periphery 38 of the sensor cover 26 is shown as a kidney shape such that the sensor cover 26 contours to the annular flange 22 shown above, the outer periphery 38 of the sensor cover 26 may be any shape without departing from the principles of the present disclosure. As discussed above, the front surface 34 of the sensor cover 26 may be substantially flat, thereby allowing the sensor cover 26 to visually blend in with a lighting fixture with which it is integrated. The rear surface 36 of the sensor cover 26 includes a number of lens sections 40, each configured to focus light from a different area surrounding the sensor cover 26 to a sensor. As discussed herein, the area presented to the front surface 34 of the sensor cover 26 is referred to as an area of interest. As the sensor cover 26 will generally be integrated into a lighting fixture, the area of interest is thus the area directly below and around the lighting fixture, and may correspond with the area that light is provided to from a light source within the lighting fixture. Notably, each one of the lens sections 40 is configured to focus light (which may be, for example, infrared light with a wavelength between 7 to 14 microns as is typical for that radiated from the human body) from a different portion of the area of interest such that together the lens sections 40 provide light to a sensor that covers the entirety of the area of interest. As discussed above, it is often desirable to maximize the area of interest, as this provides the sensors in the sensor module 12 a larger amount of data. In turn, control circuitry in the lighting fixture or remote to the lighting fixture may make more informed decisions regarding, for example, the light provided from a light source within the lighting fixture. In other situations, it may be desirable to provide a precise boundary for the area of interest and/or to maximize the uniformity of light detection within the area of interest.

Figure 5:
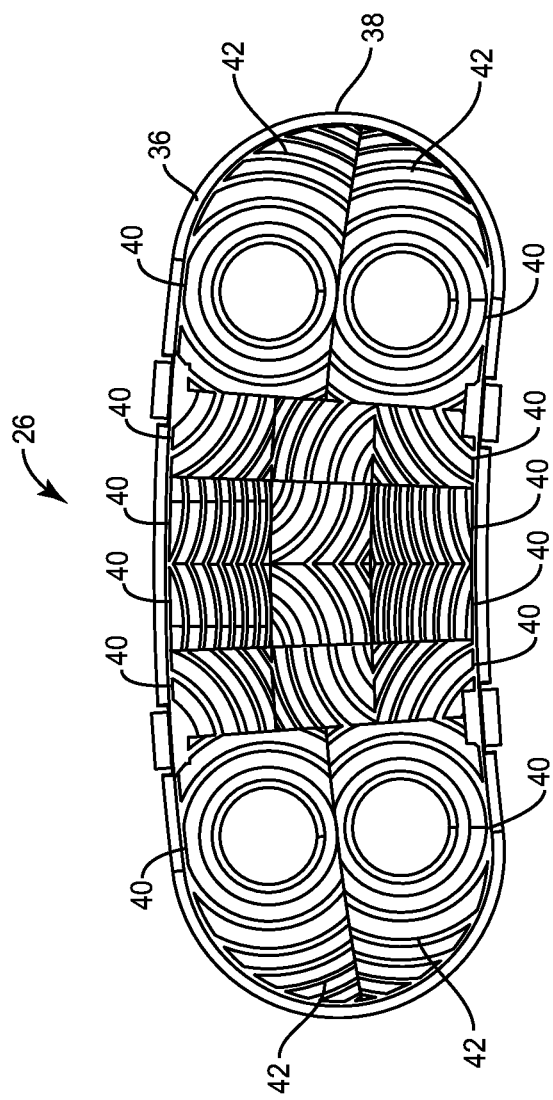
FIG. 5 shows a rear view of a sensor cover according to one embodiment of the present disclosure.
Figure 6:
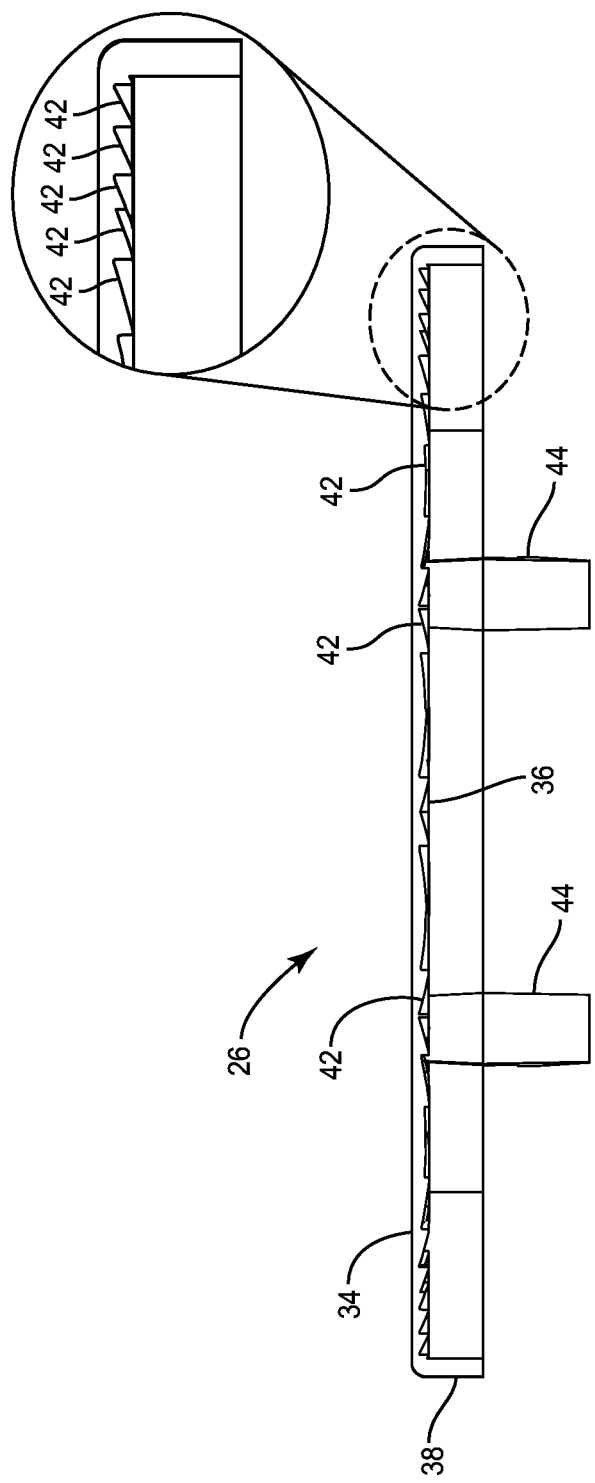
FIG. 6 shows a side view of the sensor cover shown in FIG. 5 according to one embodiment of the present disclosure.
Figure 7:
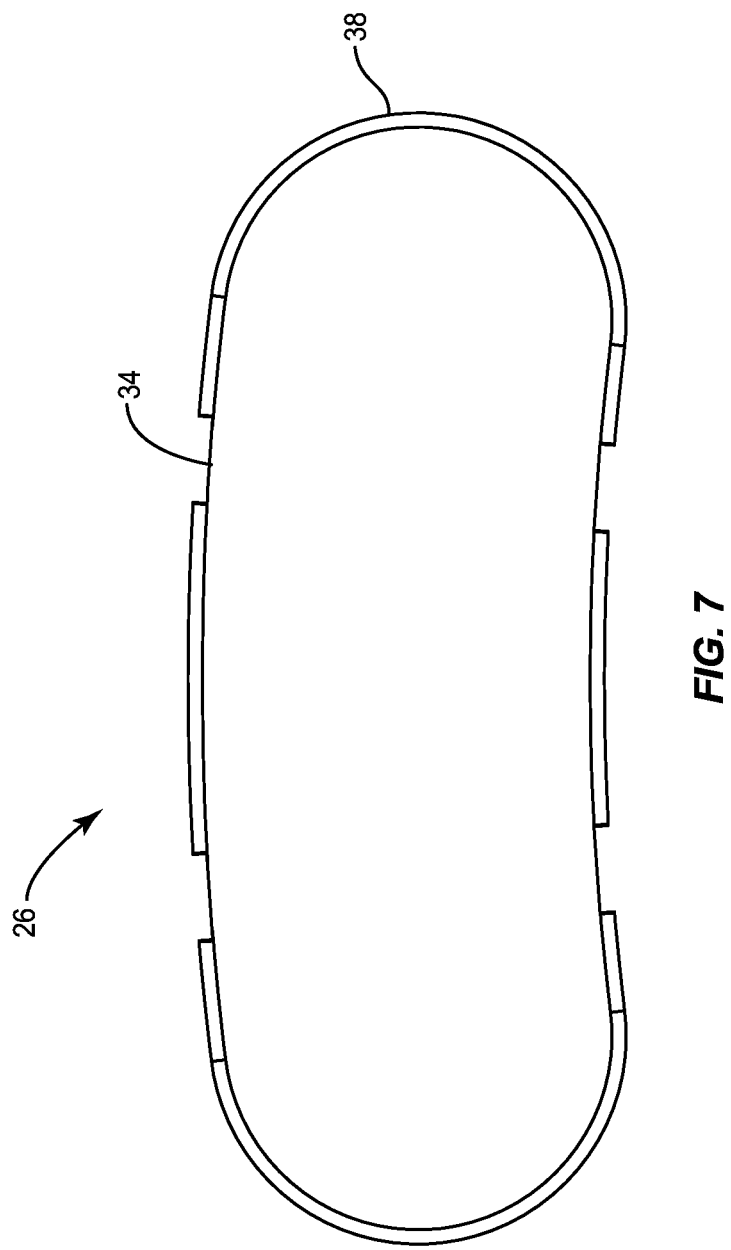
FIG. 7 shows a front view of the sensor cover shown in FIG. 5 according to one embodiment of the present disclosure.
Figure 8:
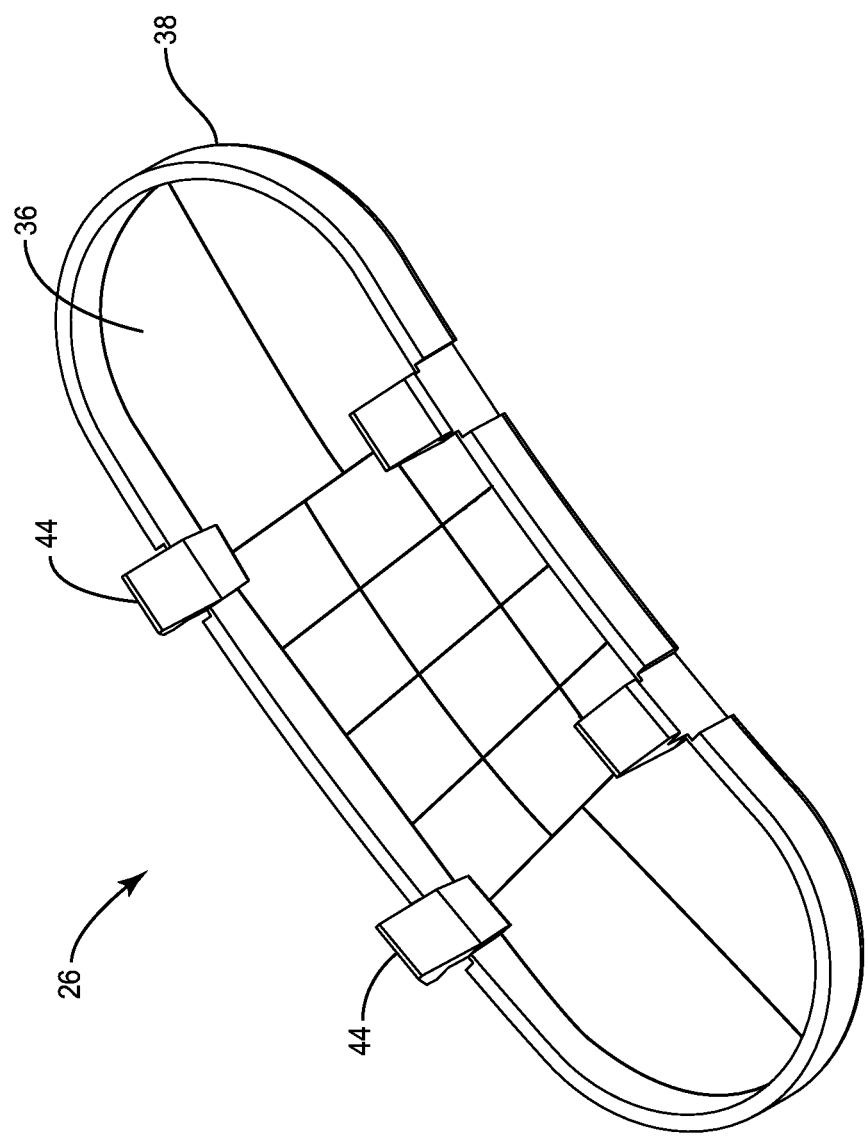
FIG. 8 shows an isometric view of the sensor cover shown in FIG. 5 according to one embodiment of the present disclosure.

In one embodiment, each one of the lens sections 40 is a Fresnel lens. While Fresnel lenses are often not of sufficient quality for use with optics, they provide large aperture and short focal lengths while remaining relatively compact. Fresnel lenses may have a flat front surface, with an opposite light-focusing surface including a number of ridges, referred to herein as Fresnel ridges, used to focus light incident to a focal point. Accordingly, FIGS. 5 and 6 show a number of Fresnel ridges 42 in each one of the lens segments. The Fresnel ridges 42 are formed and arranged such that each one of the lens sections 40 is configured to focus light, which may be infrared light, from a different portion of the area of interest to one or more focal points. Generally, these focal points will correspond with the location of a sensor in the sensor module 12. Accordingly, data from a relatively large area of interest may be provided to one or more sensors in the sensor module 12. The Fresnel ridges 42 may each have a different angle, thereby producing a different refraction pattern. Details of the Fresnel ridges 42 are shown in FIG. 6. The overall refraction from a collection of the Fresnel ridges 42 in each lens sections 40 forms a desired aperture and focal length, thereby providing a desirable response.

The sensor cover 26 includes a number of mounting clips 44. The mounting clips 44 are configured to interlock with either the annular flange 22 or a portion of the sensor module 12 itself in order to secure the sensor cover 26 in place. In one embodiment, the sensor cover 26 may include a peripheral flange that extends over the outer periphery 38 of the sensor cover such that the peripheral flange lays flat against the front surface of the annular flange 22 and thus holds the sensor cover 26 in place on the front surface of the annular flange 22. While the front surface 34 of the sensor cover 26 is discussed and shown being substantially flat, the front surface 34 of the sensor cover 26 may include one or more peripheral ridges, or may be patterned or textured in any way in order to further integrate the sensor cover 26 with the visual appearance of the lighting fixture with which it is integrated. Generally, providing a substantially flat front surface 34 of the sensor cover 26 allows the sensor cover 26 to "blend in" with a lighting fixture with which it is integrated, making it substantially less noticeable than conventional sensor modules. This is especially true if the color of the front surface 34 of the sensor cover 26 is the same as the surface of the lighting fixture with which the sensor cover 26 is integrated, as it may be in some embodiments.

As discussed above, the sensor cover 26 is primarily for use with light-based sensors. Specifically, the sensor cover 26 is primarily for use with infrared light-based sensor to detect human occupancy. In one embodiment, the sensor cover 26 may be used with an ambient light sensor. In an additional embodiment, the sensor cover 26 may be used with an occupancy sensor. As discussed above, occupancy sensors are often infrared light sensors. Accordingly, the sensor cover 26 may be configured to pass infrared light within the area of interest to the sensor. The sensor cover 26 may be formed by any suitable material. In one embodiment, the sensor cover 26 is formed from high density polypropylene (HDPP) or high density poly-ethylene (HDPE).

The sensor cover 26 may be manufactured by any number of processes. In one embodiment, the sensor cover 26 is molded via an injection molding process. In another embodiment, the sensor cover 26 is milled out of a piece of material, for example, via a computer numerical control (CNC) router or mill. In yet another embodiment, the sensor cover 26 may be printed via a three-dimensional (3D) printer.

Figure 9:
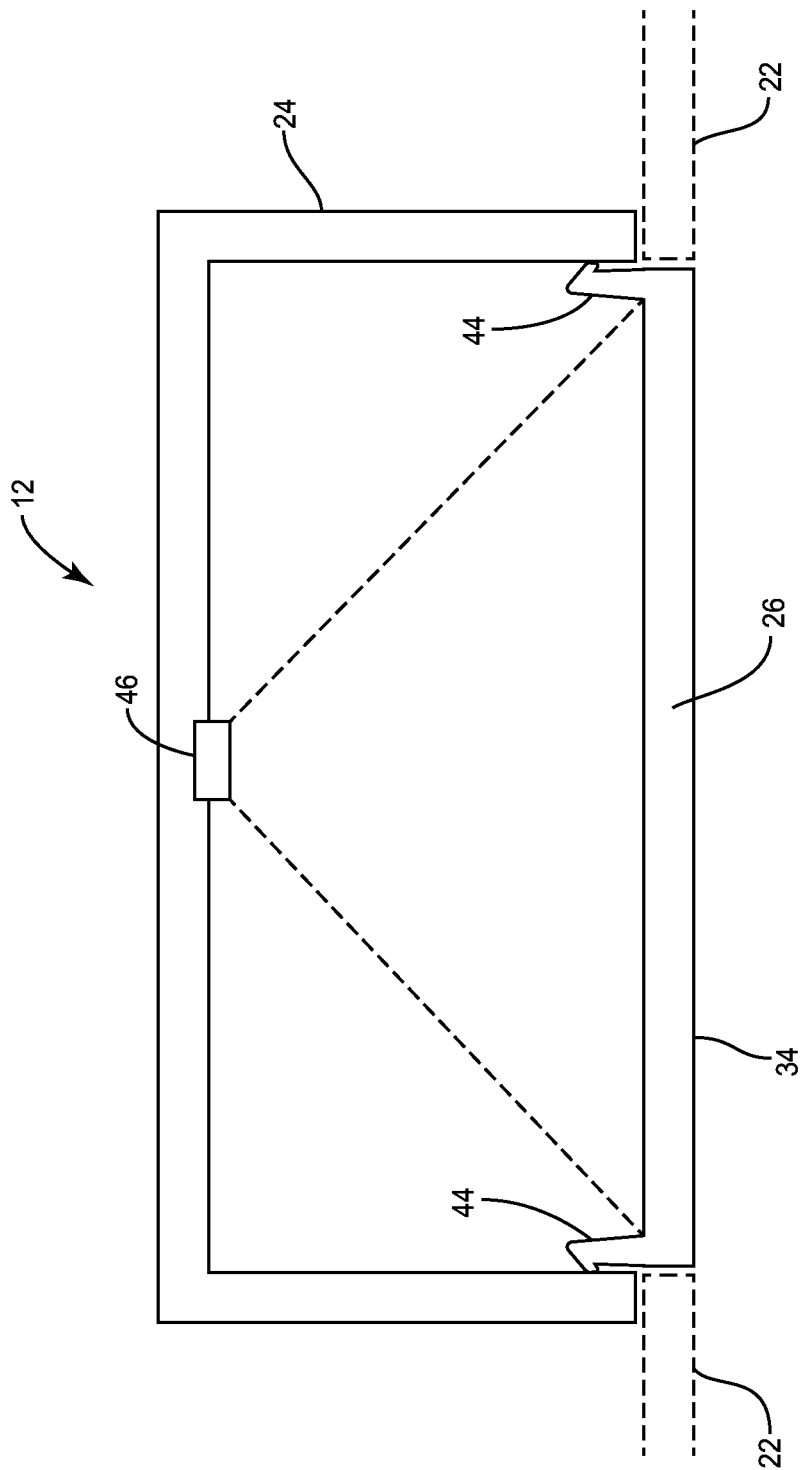
FIG. 9 shows a cross-sectional view of a sensor module according to one embodiment of the present disclosure.

FIG. 9 shows details of the sensor module 12 utilizing the sensor cover 26 shown in FIGS. 5 through 8 according to one embodiment of the present disclosure. As discussed above, the module housing 24 surrounds a sensor 46. The sensor 46 is covered by the sensor cover 26 such that the lens sections 40 focus light from different portions of the surrounding environment to the sensor 46. The mounting clips 44 of the sensor cover 26 engage with the module housing 24 to secure the sensor cover 26 in place. The front surface 34 of the sensor cover 26 is substantially flush with the annular flange 22 of the lighting fixture 10.

Figure 10:
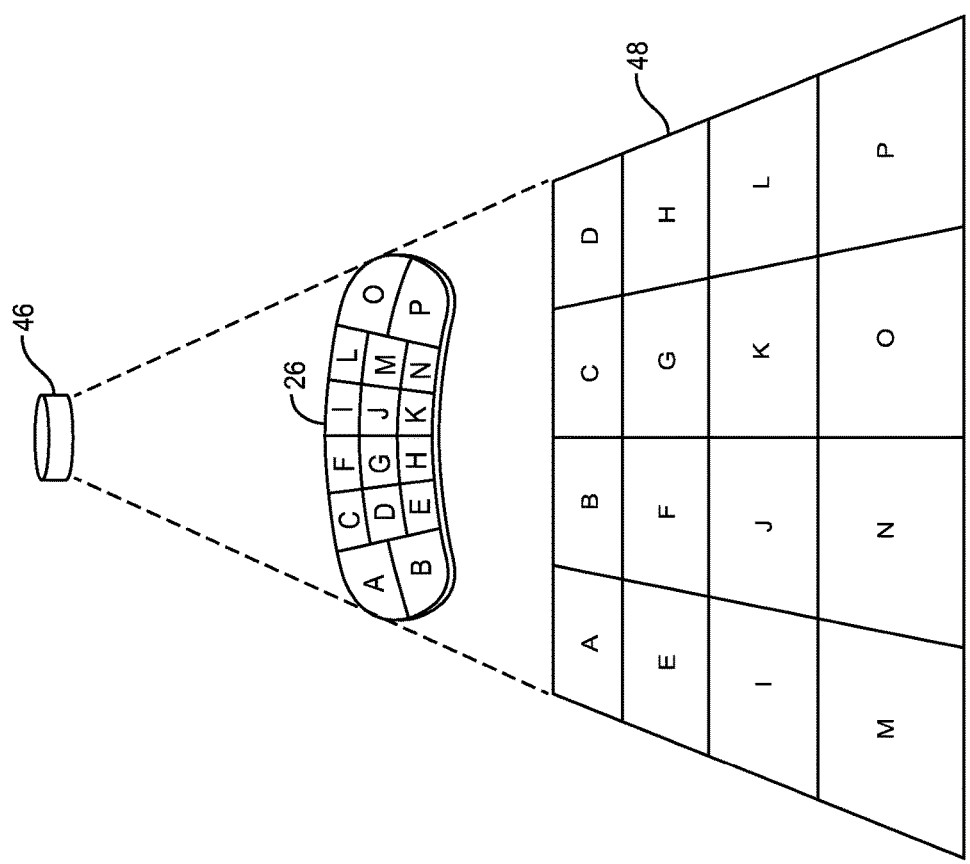
FIG. 10 is a diagram illustrating the operation of a sensor cover according to one embodiment of the present disclosure.

FIG. 10 shows details of the operation of the sensor cover 26 according to one embodiment of the present disclosure. Specifically, FIG. 10 shows an area of interest 48 in front of the front surface 34 of the sensor cover 26, and the sensor 46 aligned with a focal point behind the rear surface 36 of the sensor cover 26. The area of interest 48 is broken up into a number of sections (A-P). Each one of the lens sections 40 is configured to focus light from one of the sections (A-P) of the area of interest 48, such that together the lens sections 40 provide the sensor 46 with information about the entire area of interest 48. The particular portion of the area of interest 48 captured by a particular lens section 40 is merely exemplary. That is, each lens section 40 may not focus light from any one of the different sections (A-P) of the area of interest 48 without departing from the principles of the present disclosure. As discussed above, the sensor 46 may be an ambient light sensor or an infrared occupancy sensor.

The area of interest 48 is defined by a width $W_{AI}$ and a height $H_{AI}$, which are referred to collectively as a field of view (FOV). As discussed above, it is often desirable to maximize the FOV in order to provide the sensor with as much information as possible about the surrounding environment. In other embodiments, having a specific range for the FOV is desirable.

Due to the design of the sensor cover 26, a working distance $WD_{AI}$ of 12.5 ft may provide a circular area of interest 48 with a diameter of 19 ft for a field of view of the circular area of about 1.8 steradian (area/distance$^2$ or $(19/2$ ft$)^2 \pi / 12.5$ ft$^2$). Frequently, FOV is used for an angle subtended to horizontal, vertical, or diagonal distance of the area, respectively, and to utilize the largest angle of the angle corresponding to the diagonal. For a circular area, FOV is frequently used for the angle subtended to the diameter, which is about 75° in one embodiment.

Figure 11:
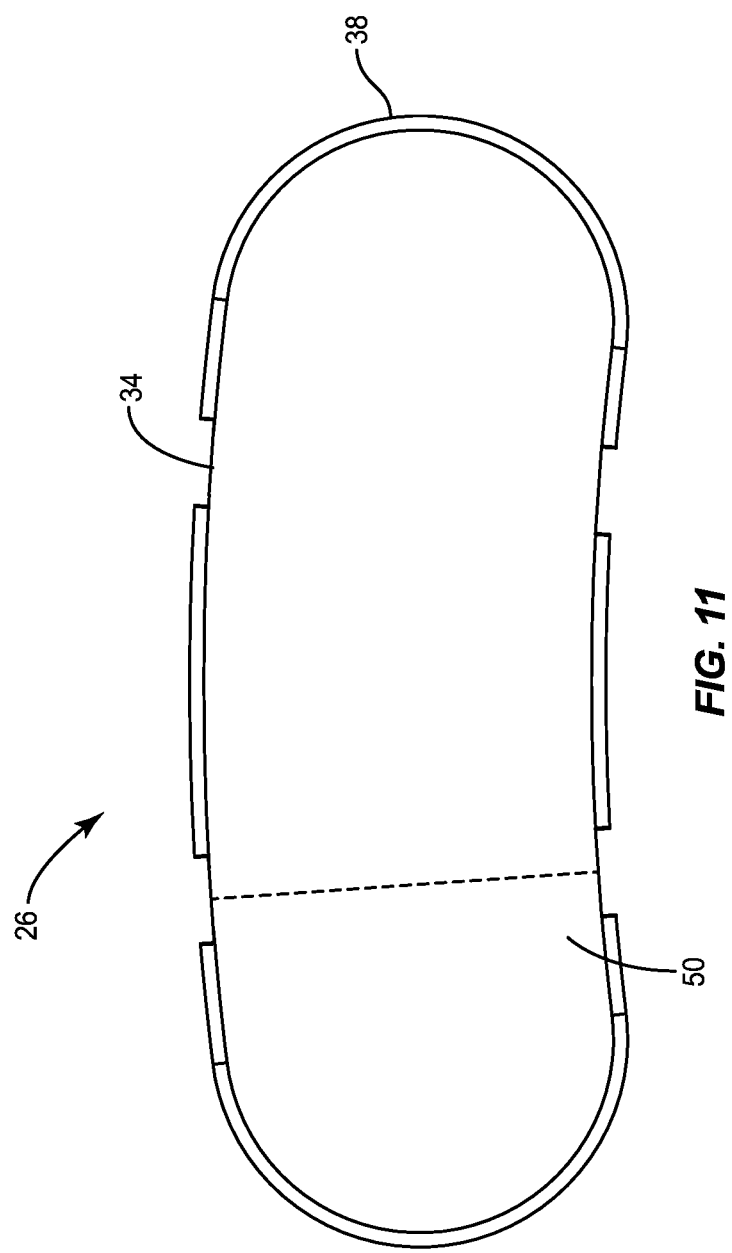
FIG. 11 is a front view of a sensor cover according to an additional embodiment of the present disclosure.

FIG. 11 shows the sensor cover 26 according to an additional embodiment of the present disclosure. The sensor cover 26 in FIG. 11 is substantially similar to that described above with respect to FIGS. 5 through 8, but further includes a transparent section 50, which does not include any Fresnel ridges 42. Accordingly, light passes through the transparent section 50 of the sensor cover 26 unfocused, while light is focused via the lens sections 40 as discussed above. In one embodiment, a first sensor 46A is placed behind the lens sections 40, while a second sensor 46B is placed behind the transparent section 50 of the sensor cover 26. The first sensor 46A may be one that requires access to light information about a relatively large area of interest, while the second sensor 46B may be one that only requires access to light information directly below the sensor cover 26. In one embodiment, the first sensor 46A is an occupancy sensor, while the second sensor 46B is an ambient light sensor. Dividing the sensor cover 26 into the transparent section 50 and the lens sections 40 allows the sensor cover 26 to service multiple sensors while providing a substantially uniform front surface, thereby improving the aesthetic appeal of the sensor cover 26.

Figure 12:
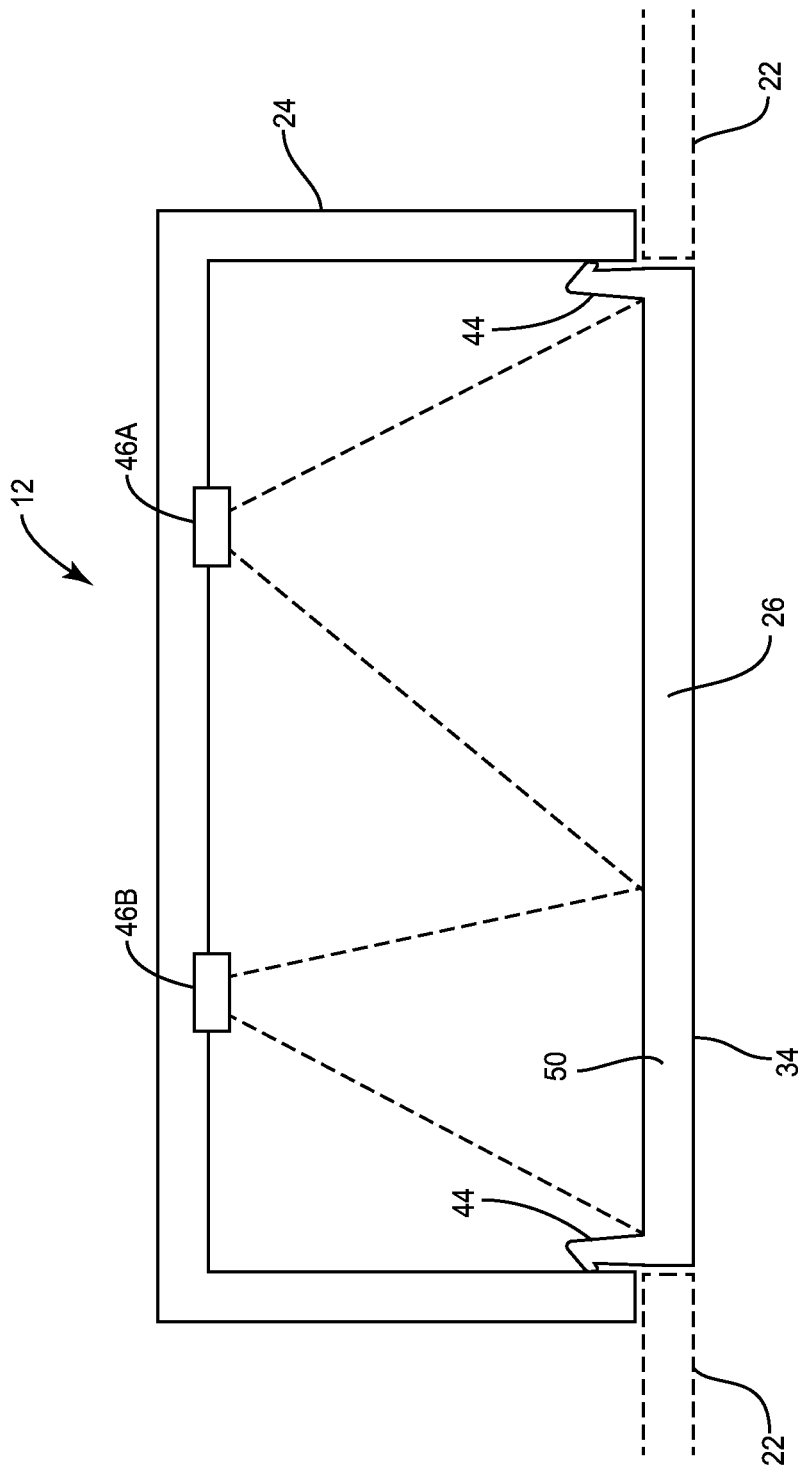
FIG. 12 is a cross-sectional view of a sensor module according to an additional embodiment of the present disclosure.

FIG. 12 shows details of the sensor module 12 utilizing the sensor cover 26 shown in FIG. 11 according to one embodiment of the present disclosure. As discussed above, the module housing 24 surrounds the first sensor 46A and the second sensor 46B. The first sensor 46A is behind the lens sections 40 of the sensor cover 26 such that light from different portions of the surrounding environment is focused onto the first sensor 46A, while the second sensor 46B is behind the transparent section 50 of the sensor cover 26 such that unfocused light is passed to the second sensor 46B. A divider (not shown) may be provided between the first sensor 46A and the second sensor 46B in order to prevent the leakage of light between the separate sections of the sensor cover 26. The mounting clips 44 of the sensor cover 26 engage with the module housing 24 to secure the sensor cover 26 in place. The front surface 34 of the sensor cover 26 is substantially flush with the annular flange 22 of the lighting fixture 10.

Figure 13:
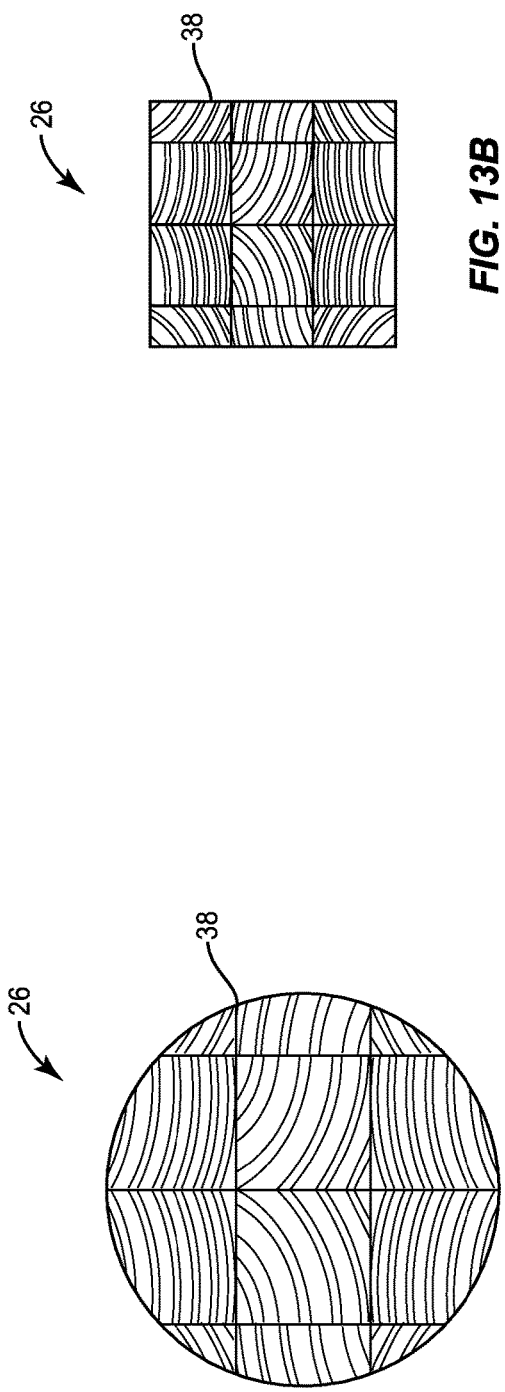
FIGS. 13A through 13C illustrate sensor covers according to various embodiments of the present disclosure.

FIGS. 13A through 13C show the sensor cover 26 according to additional embodiments of the present disclosure. Specifically, FIG. 13A shows the sensor cover 26 wherein the outer periphery 38 of the sensor cover 26 is circular in shape. FIG. 13B shows the sensor cover 26 wherein the outer periphery 38 of the sensor cover 26 is square in shape. FIG. 13C shows the sensor cover 26 wherein the outer periphery 38 of the sensor cover 26 is rectangular in shape. The particular shape of the outer periphery 38 of the sensor cover 26 will be chosen based on the particular needs of the application for which it is being used. For example, different types of lighting fixtures may present different areas, shapes, and visual appearances that mandate different shapes for the sensor cover 26. In general, the sensor cover 26 is a shape that is able to minimize the visual impact of the sensor cover 26 and therefore blend in with the lighting fixture.

Figure 14:
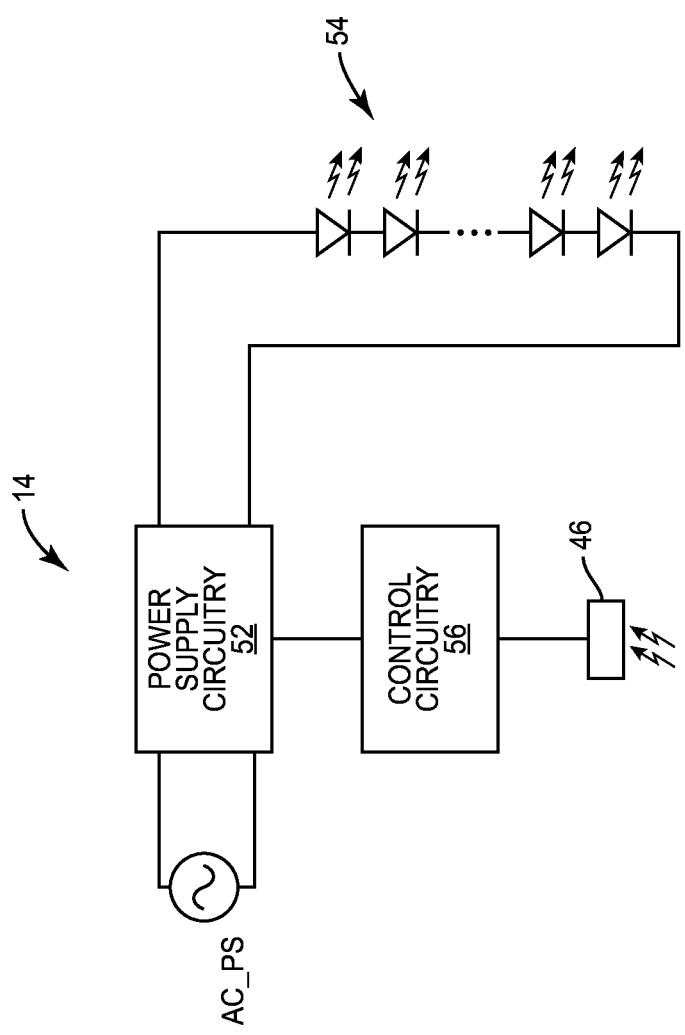
FIG. 14 illustrates circuitry for a lighting fixture according to one embodiment of the present disclosure.

FIG. 14 shows details of the control module 14 of the lighting fixture 10 according to one embodiment of the present disclosure. The control module 14 includes power supply circuitry 52 coupled to a solid-state light source 54. In one embodiment, the solid-state light source 54 includes a number of light emitting diodes (LEDs) coupled in series. Additional parallel strings of LEDs may be present in the solid-state light source 54 in some embodiments. The power supply circuitry 52 is additionally coupled to an alternating current (AC) power source AC_PS, such as a commercial or residential power line. Control circuitry 56 is also present in the lighting fixture 10. The control circuitry 56 is coupled to the sensor 46 (and may be coupled to more than one sensor in some embodiments) and the power supply circuitry 52. In operation, the control circuitry 56 receives one or more measurements from the sensor 46 and provides a power supply control signal to the power supply circuitry 52 in order to control a light output of the solid-state light source 54. Accordingly, the sensor 46 may influence the light output of the solid-state light source 54.

Those skilled in the art will recognize improvements and modifications to the preferred embodiments of the present disclosure. All such improvements and modifications are considered within the scope of the concepts disclosed herein and the claims that follow.

What is claimed is:

1. A sensor module for a lighting fixture comprising:
    a first light sensor and a second light sensor, wherein the second light sensor is a different type of light sensor than the first light sensor; and
    a sensor cover over the first light sensor and the second light sensor, the sensor cover comprising:
        a front surface oriented to face an area of interest; and
        a rear surface opposite the front surface and comprising:
            a plurality of lens sections, each of the plurality of lens sections configured to focus light from a different portion of the area of interest to the first light sensor; and
            a transparent section that is divided from the plurality of lens sections and is configured to pass unfocused light to the second light sensor;
        wherein the sensor cover is secured to the sensor module.

2. The sensor module of claim 1 wherein the first light sensor is an infrared occupancy sensor.

3. The sensor module of claim 1 wherein each one of the plurality of lens sections comprises a Fresnel lens.

4. The sensor module of claim 3 wherein each one of the plurality of lens sections has a unique Fresnel pattern.

5. The sensor module of claim 1 wherein the front surface of the sensor cover is substantially flat.

6. The sensor module of claim 1 wherein the front surface of the sensor cover is configured to lay flush with an exposed surface of the lighting fixture.

7. The sensor module of claim 1 wherein the second light sensor is an ambient light sensor.

8. The sensor module of claim 1 wherein the sensor cover is a kidney shape.

9. The sensor module of claim 8 wherein the front surface of the sensor cover is configured to be flush mounted in an exposed annular portion of the lighting fixture.

10. The sensor module of claim 1 wherein the plurality of lens sections collectively have a field of view greater than about 284 ft$^2$ for a working distance of about 12.5 ft.

11. A lighting fixture comprising:
    a light source;
    a housing coupled to the light source and comprising an opening through which light generated by the light source is emitted;
    a first light sensor and a second light sensor mounted to the housing and outside of the opening, wherein the second light sensor is a different type of light sensor than the first light sensor; and
    a sensor cover coupled to the housing and over the first light sensor and the second light sensor, the sensor cover comprising:
        a front surface oriented to face an area of interest; and
        a rear surface opposite the front surface and comprising:
            a plurality of lens sections, each of the lens sections configured to focus light from a different portion of the area of interest to the first light sensor; and
            a transparent section configured to pass unfocused light to the second light sensor.

12. The lighting fixture of claim 11 wherein the housing further comprises an annular flange surrounding the opening such that a front surface of the annular flange is exposed to the area of interest upon installation of the lighting fixture.

13. The lighting fixture of claim 12 wherein the sensor cover is mounted in the annular flange.

14. The lighting fixture of claim 13 wherein the front surface of the sensor cover is substantially flush with the front surface of the annular flange.

15. The lighting fixture of claim 11 wherein the light source is configured to generally illuminate the area of interest.

16. The lighting fixture of claim 11 wherein the first light sensor is an infrared occupancy sensor.

17. The lighting fixture of claim 11 wherein each one of the plurality of lens sections comprises a Fresnel lens.

18. The lighting fixture of claim 17 wherein each one of the plurality of lens sections has a unique Fresnel pattern.

19. The lighting fixture of claim 11 wherein the front surface of the sensor cover is substantially flat.

20. The lighting fixture of claim 11 wherein the front surface of the sensor cover is configured to lay flush with an exposed surface of the housing of the lighting fixture.

21. The lighting fixture of claim 11 further comprising control circuitry configured to receive one or more measurements from the first light sensor and adjust a light output of the light source based on the one or more measurements.

22. The lighting fixture of claim 11 wherein the second light sensor is an ambient light sensor.

23. The lighting fixture of claim 11 wherein the sensor cover is a kidney shape.

24. The lighting fixture of claim 11 wherein the plurality of lens sections collectively have a field of view greater than about 284 ft$^2$ for a working distance of about 12.5 ft.

25. The lighting fixture of claim 11 wherein the first light sensor and the second light sensor are mounted to a sidewall of the housing outside of the opening.

26. The lighting fixture of claim 11 wherein the first light sensor and the second light sensor are mounted to a flange of the housing outside of the opening.

\* \* \* \* \*